No. 748,546. PATENTED DEC. 29, 1903.
R. E. VAIL.
EXPANSION JOINT.
APPLICATION FILED APR. 17, 1903.
NO MODEL.

WITNESSES:
Robert Head
Rev. G. Hostet

INVENTOR
Ralph E. Vail
BY
ATTORNEYS.

No. 748,546. Patented December 29, 1903.

UNITED STATES PATENT OFFICE.

RALPH ERNEST VAIL, OF MOUNT VERNON, OHIO.

EXPANSION-JOINT.

SPECIFICATION forming part of Letters Patent No. 748,546, dated December 29, 1903.

Application filed April 17, 1903. Serial No. 153,025. (No model.)

*To all whom it may concern:*

Be it known that I, RALPH ERNEST VAIL, a citizen of the United States, and a resident of Mount Vernon, in the county of Knox and State of Ohio, have invented a new and Improved Expansion-Joint, of which the following is a full, clear, and exact description.

The invention relates to pipe-lines; and its object is to provide a new and improved expansion-joint arranged to allow free expansion and contraction of the pipe-line without danger of leakage and to allow of readily coupling the adjacent ends of a broken line together.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all the views.

Figure 1:
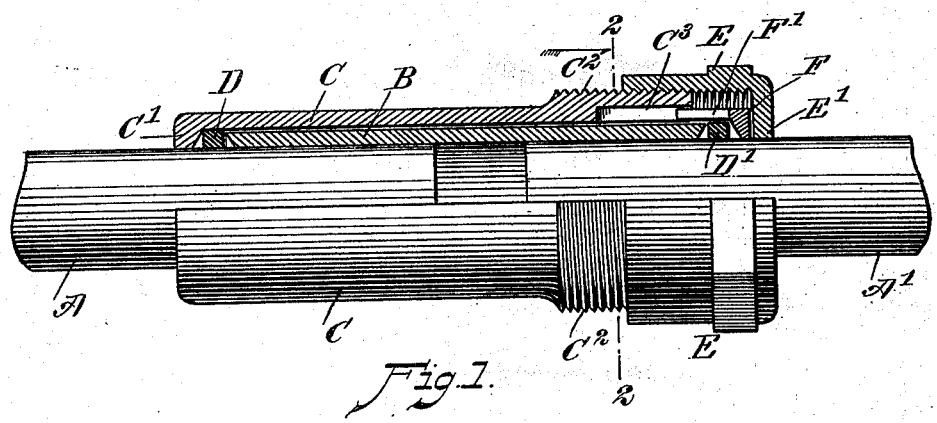
Figure 2:
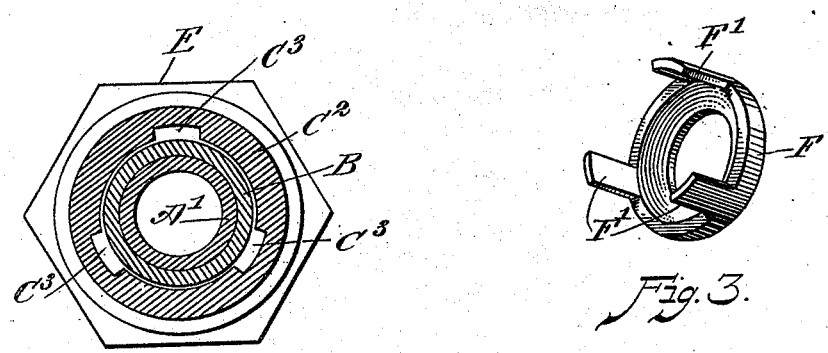
Figure 3:
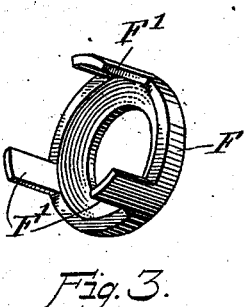

Figure 1 is a longitudinal sectional elevation of the improvement. Fig. 2 is a cross-section of the same on the line 2 2 of Fig. 1, and Fig. 3 is a perspective view of the packing-protector.

On the adjacent ends A A' of a pipe-line is fitted a sleeve B, contained within a tubular casing C, having its bore reduced at one end C' to fit the pipe end A, and between this casing end C' and the adjacent end of the sleeve B is placed a packing D to prevent leakage at this end of the expansion-joint. The other end $C^2$ of the casing C is provided with a screw-thread, on which screws a nut E, having its outer end formed with a reduced bore E', fitting the pipe end A', and inside of this nut is arranged a ring-shaped packing-protector F, likewise fitting the pipe end A' and engaging a packing D', arranged around the pipe end A' between the said protector F and the adjacent end of the sleeve B. The protector F has a connection with the casing C to prevent the protector from turning, and thereby protect the packing D' from injury when screwing up the nut E and tightening the several parts. For the purpose mentioned the protector F is provided with a plurality of longitudinally-extending lugs F', projecting into longitudinal grooves or guideways $C^3$, formed on the inside of the casing C, as plainly illustrated in Figs. 1 and 2. Now by the lugs engaging the guideways $C^3$ the protector F is prevented from turning, but is free to slide longitudinally on the pipe end A' when screwing up the nut E to tighten the several parts. Now it will be seen that when this takes place the packing D is firmly compressed between the end C' and the adjacent end of the sleeve B, while the packing D' is compressed between the protector F and the adjacent end of the sleeve B to prevent leakage at both ends of the expansion-joint.

It is understood that as the packings D and D' are of rubber or like soft material they are not liable to be injured by the protector F when screwing up the nut E, as the protector moves longitudinally only and does not turn, and consequently does not grind the packing D'.

Having thus described my invention, I claim as new and desire to secure by Letters Patent—

An expansion-joint for coupling adjacent pipe ends, comprising a tubular casing engaging, at one end, one of the pipe ends, a nut screwing on the other end of the casing and engaging the other pipe end, said casing having equidistant longitudinal grooves on the inner face of its end carrying the nut, a sleeve fitted upon both pipe ends, within the casing, a packing-protector adapted to be engaged by the nut, said protector having a circular head with a central bore for the reception of the pipe and a plurality of longitudinal lugs at one side of said plate flush with the periphery thereof and equal in number to the aforesaid longitudinal grooves and adapted to be received into said grooves, the internal faces of said lugs coinciding with the internal diameter of the casing, and a packing interposed between the protector and the adjacent end of the sleeve, as set forth.

In testimony whereof I have signed my name to this specification in the presence of two subscribing witnesses.

RALPH ERNEST VAIL.

Witnesses:
FRANK HARPER,
L. M. DRAKE.